United States Patent [19]

Hembjer et al.

[11] Patent Number: 5,096,660
[45] Date of Patent: Mar. 17, 1992

[54] FUEL ASSEMBLY FOR A BOILING REACTOR

[75] Inventors: Olof Hembjer; Ragnar Månsson; Olov Nylund, all of Västerås, all of Sweden

[73] Assignee: ABB Atom AB, Vasteras, Sweden

[21] Appl. No.: 606,924

[22] Filed: Oct. 31, 1990

[30] Foreign Application Priority Data

Nov. 14, 1989 [SE] Sweden .................. 8903815

[51] Int. Cl.$^5$ .............................................. G21C 3/34
[52] U.S. Cl. .................... 376/438; 376/434; 376/439; 376/443; 376/448; 376/426
[58] Field of Search ............... 376/438, 434, 439, 443, 376/448, 426

[56] References Cited

U.S. PATENT DOCUMENTS 3,892,625  7/1975  Patterson .................. 376/176
4,056,441  11/1977 Marmonier et al. ........... 376/438
4,678,630  7/1987  King et al. .................. 376/438
4,692,303  9/1987  Osborne ..................... 376/446

Primary Examiner—Donald P. Walsh
Assistant Examiner—Meena Chelliah
Attorney, Agent, or Firm—Watson, Cole, Grindle & Watson

[57] ABSTRACT

A fuel assembly in the form of an elongated channel having several corners is connected to a coolant intended to flow through the channel. A bundle of similarly elongated fuel rods, retained by a plurality of spacers, is arranged in the channel, and arranged in the upper part of the fuel assembly, at least between a pair of spacers, is a sleeve formed of a sheet around the bundle. The sleeve has an external shape which conforms closely to the walls of the fuel assembly and is perforated by a large number of openings, the total surface of which is at least as large as the sheet surface remaining on one side of the sleeve.

7 Claims, 2 Drawing Sheets

FUEL ASSEMBLY FOR A BOILING REACTOR

BACKGROUND OF THE INVENTION

The present invention relates to a fuel assembly for a boiling reactor.

A fuel assembly comprises a bundle of elongated fuel rods retained by a number of so-called spacers placed with a certain distance between each other along the bundle. A coolant, for example water, is adapted to flow from below and upwards through the fuel assembly, which normally is arranged vertically and, upon a nuclear reaction, to cool the fuel rods arranged in the fuel assembly. The object of the invention is to increase the efficiency of this cooling of the fuel rods.

In a boiling type nuclear reactor the steam formation in the fuel assembly increases more and more towards the upper part of the assembly, as is clear from FIG. 1 which shows, in rough outline, a cross section of part of a fuel assembly. In FIG. 1, 1 designates a fuel rod and 2 spaces between the rods. This space 2 is in the lower part of the fuel assembly (corresponding to the lower part of the core of the reactor), filled with coolant, in this case water. Further up in the fuel assembly, steam bubbles 3 are formed in the water which, still further up, is transformed into water steam in the region 4. As long as so-called dry out does not take place, however, there is always a film 5 of the cooling water on the fuel rods. It is important that this film 5 is maintained at all points of the rods 1. If at some point it disappears by dry out, serious damage at this point of the fuel rod 1 will rapidly arise.

In FIG. 1, 6 designates the wall of the fuel assembly. Also this is normally coated with a water film 5. However, this film 5 is not entirely necessary since the wall 6 of the assembly is considerably more insensitive to superheating compared with the fuel rods. This fact has been observed, and attempts have been made to make use of it in some known designs, as, for example, in U.S. Pat. No. 4,749,543, column 8 and FIG. 9. In these designs, the cooling water flowing along the wall 6 of the fuel assembly is diverted towards the centre of the bundle by means of elevations on the wall 6 or recesses in the same. Also fins on the downstream side of the spacers are used to achieve a diversion or deflection of the cooling water. All these embodiments have certain drawbacks. Thus, for example, the elevations may increase the pressure drop in the cooling water and thus reduce the cooling effect, whereas recesses in the wall entail certain difficulties from the point of view of manufacturing technique. Further, a deflection of the cooling water flowing along the assembly wall 6 should take place as early as possible in relation to each separate spacer and, in any case, preferably not immediately after the same, viewed in the direction of flow. This is due to the fact that dry outs normally occur immediately upstream of a spacer or possibly in the same.

SUMMARY OF THE INVENTION

The present invention relates to a device for achieving the desired deflection of the coolant in a simple manner. According to the invention, there is arranged in the upper part of the fuel assembly, at least between a pair of spacers, a sleeve formed of sheet around the bundle with fuel rods. The sleeve has an external shape which conforms closely to the walls of the fuel assembly, and the sheet is perforated by a large number of openings, the total surface of which is at least as large as the sheet surface remaining on one side of the sleeve.

By the above-mentioned device, improved cooling in the bundle is obtained in a relatively simple manner by scraping the film of coolant along the wall of the fuel assembly from the wall and throwing it in towards the centre of the bundle. Since the sleeve is perforated by a large number of openings, the sleeve is at the same time prevented from causing a considerable pressure drop in the coolant flowing through the fuel assembly. Another advantage is that in connection with the assembly of the bundle it is simple to fit one or several sleeves onto the bundle. The sleeves are kept in position by the spacers.

To reduce the flow resistance of the sleeve still further, the sleeve sheet may be punched into a net-like structure. The meshes are advantageously given a rhomb-shaped appearance and are arranged with the longer diagonal in the longitudinal direction of the bundle. This further reduces the flow resistance of the sleeve when the coolant, on its way upwards along the sleeve, substantially encounters only oblique sheet edges.

To facilitate the insertion of the bundle with the sleeve or sleeves fitted thereon, each respective sleeve is provided at the lower part with a guiding edge by bending the lower edge of the sleeve somewhat inwards towards the centre of the bundle.

Since the sleeve is not subjected to any major mechanical stresses, it may advantageously be made of Zircaloy, which is known as a material with low neutron absorption.

BRIEF DESCRIPTION OF THE DRAWINGS

The invention will be best understood with reference to the accompanying FIGS. 1-6.

In FIG. 2, 7 designates the fuel assembly in the form of an elongated channel having several corners and a wall 6. Spacers 8 and 9 of a known type are arranged in the fuel assembly. The spaces retain a sub-bundle of fuel rods 1. Between the spacers 8 and 9, a sleeve 10 according to the invention has been inserted around the sub-bundle. The sleeve 10 may be given such dimensions that it fits into the shown sub-channel in the fuel assembly 7. The same arrangement may, of course, be used where the fuel assembly 7 only comprises one single bundle and thus is not divided into four sections as shown in FIGS. 2 and 3. The sleeve 10 has such dimensions that, in the inserted position of the bundle, it closely conforms to the wall 6 of the fuel assembly 7 and, in the case of a fuel assembly 7 divided into sections by means of inner walls 11, also to these inner walls 11. Otherwise, the sleeve 10 surrounds the bundle of fuel rods rather loosely and is supported at the bottom against—in this case—the spacer 8. The lower edge of the sleeve 10 is bent somewhat inwards so as to be easily guided into the fuel assembly 7.

FIG. 4 shows the sleeve 10 folded out and punched into a net-like structure. The sheet used is suitably of Zircaloy and has a thickness of 0.8 mm. The squares of the net are rhombic, with the longer diagonal arranged such that it will coincide with the longitudinal axis of the fuel rod bundle.

FIG. 5 shows the sheet folded and welded into a sleeve 10 with a cross section according to FIG. 6. At the bottom the sleeve 10 is provided with guide studs 12 folded towards the centre of the sleeve 10.

Figure 1:
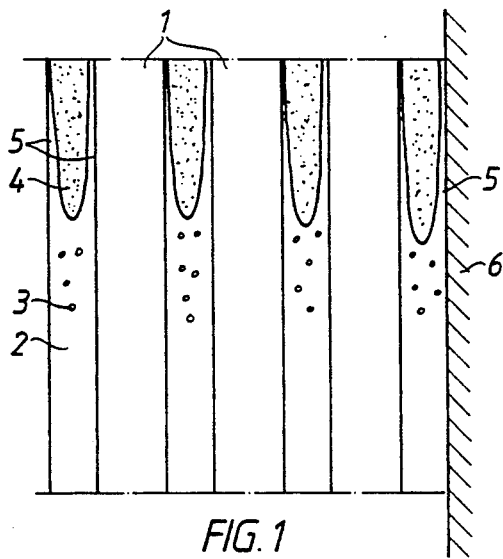
FIG. 1 shows the wall of the fuel assembly.
Figure 3:
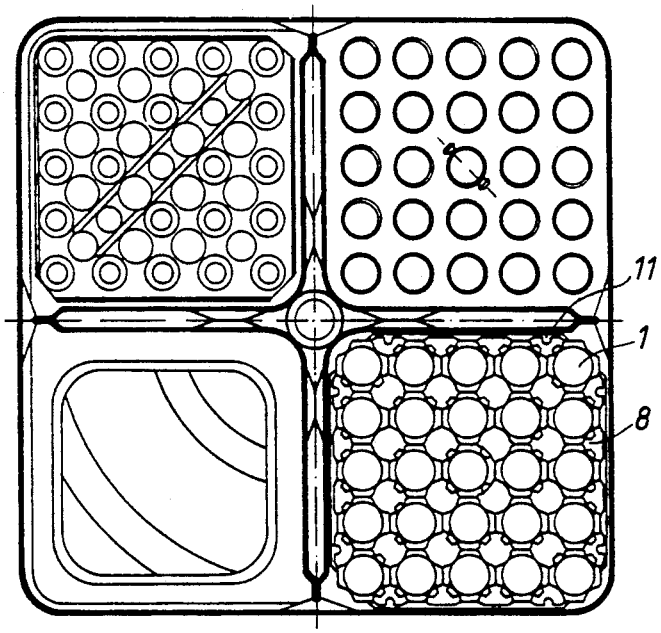
FIG. 2 shows a fuel assembly for four separate bundle fuel rods and FIG. 3 shows a cross section through the same assembly.
Figure 2:
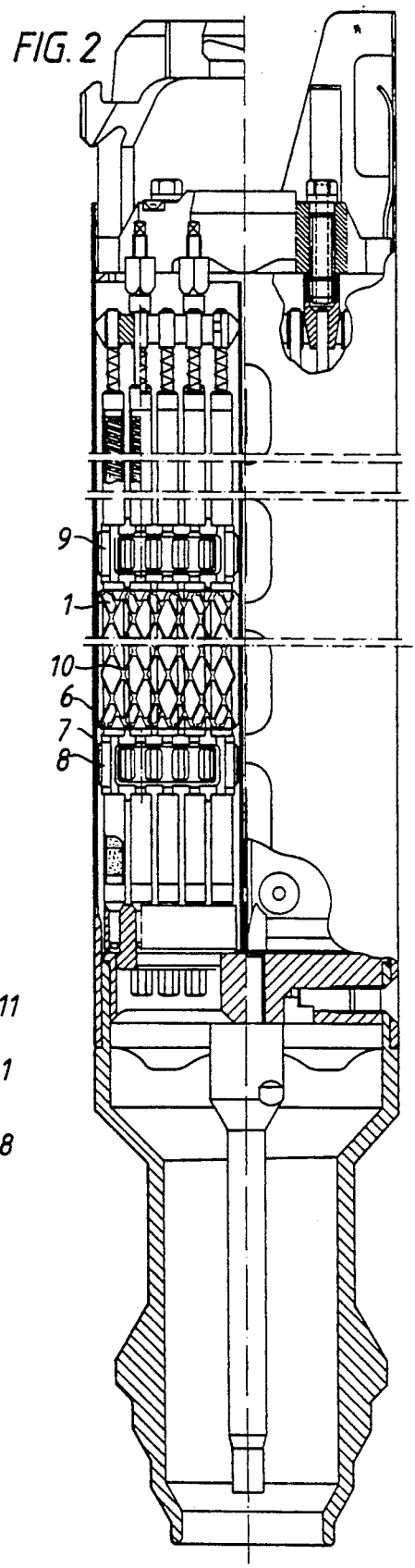
Figure 4:
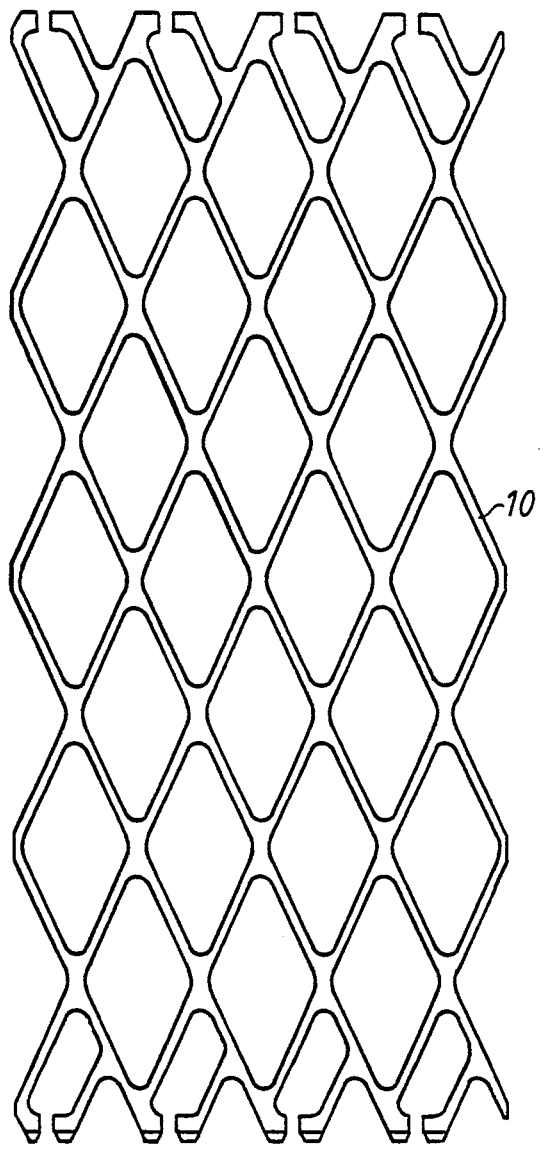
FIG. 4 shows the sleeve sheet folded out and punched into a net-like structure.
Figure 5:
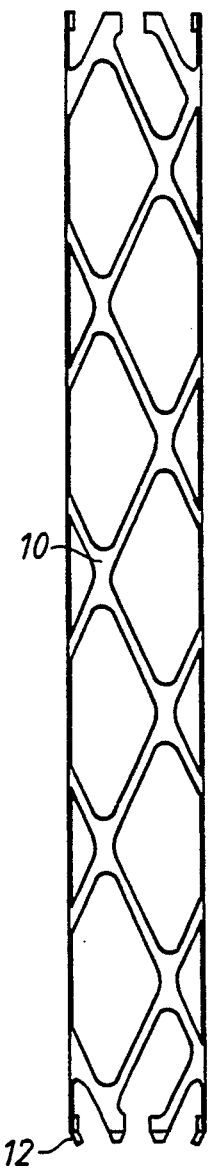
FIG. 5 shows the same sheet folded into a sleeve with a cross section according to FIG. 6.
Figure 6:
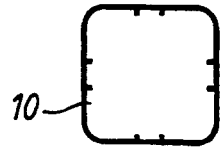

When cooling water passes up through the fuel box 7 and, in the upper part of the box 7, is reduced to a water film on the wall 6 of the box as well as on the fuel rods 1, the intention according to the invention is that the cooling water flowing along the box wall 6 should contact the sleeve 10. The sleeve 10 forms an elevation along the box wall 6 and scrapes off the cooling water from the box wall 6 and throws it towards the fuel rods located inside, the cooling of these fuel rods thus being improved. Since the sleeve has been given a structure with large openings, the pressure drop is prevented from becoming unnecessarily great. A particularly suitable net-like shape in this respect is shown, as mentioned, in FIGS. 4–6. Because the squares in the net are rhomb-shaped with the longer diagonal in the longitudinal direction of the bundle, the upwardly-flowing cooling water substantially only encounters oblique elevations, which results in a further reduced pressure drop. Other net-like configurations are, of course, possible; the main thing is, however, that the cooling water to the greatest possible extent contacts oblique elevations.

Where necessary, several sleeves may be inserted; however, only one sleeve between each pair of adjacent spacers.

We claim:

1. A fuel assembly having walls which define an internal elongated channel having several corners, a bundle of similarly elongated fuel rods arranged in the channel and retained by a plurality of spacers located along the bundle, a sleeve formed of a sheet arranged around the bundle and between a pair of spacers in an upper part of the fuel assembly, the external shape of the sleeve being such that it conforms closely to the walls of the fuel assembly, said sheet being perforated by a large number of openings, the total surface of which is at least as large as the sheet surface remaining on one side of the sleeve.

2. A fuel assembly according to claim 1, wherein the sleeve sheet is punched into a net-like structure.

3. A fuel assembly according to claim 2, wherein the openings in the sleeve are rhomb-shaped and arranged with the longer diagonal in the longitudinal direction of the bundle.

4. A fuel assembly according to claim 1, wherein a lower edge of the sleeve is formed so as to bend somewhat inwards towards the centre of the bundle.

5. A fuel assembly according to claim 1, wherein the sleeve is made of Zircaloy.

6. A fuel assembly according to claim 2, wherein a lower edge of the sheet is bent inwardly towards a center of the bundle.

7. A fuel assembly according to claim 2, wherein the sleeve is composed of zircaloy.

* * * * *